United States Patent [19]

Lasater

[11] 4,407,665

[45] Oct. 4, 1983

[54] LIQUID DEGASIFICATION DEVICE

[76] Inventor: Henry C. Lasater, Box 616, Cuba, N. Mex. 87013

[21] Appl. No.: 132,888

[22] Filed: Mar. 24, 1980

[51] Int. Cl.³ .............................................. B01D 19/00
[52] U.S. Cl. ......................................... 55/55; 55/57; 55/195
[58] Field of Search ..................... 55/36, 55, 189, 195, 55/57; 417/150; 137/593; 203/91

[56] References Cited

U.S. PATENT DOCUMENTS

| 106,251 | 8/1870 | Boynton | 417/150 X |
| 208,846 | 10/1878 | Plumb | 55/57 |
| 618,998 | 2/1899 | Rothe | 55/55 X |

FOREIGN PATENT DOCUMENTS 52-39571  3/1977  Japan ...................... 55/189

OTHER PUBLICATIONS

Shortley, et al., "Elements of Physics", Fourth Edition, pp. 272, 273, 367, and 377, 1965, copy in 55—55.

Primary Examiner—Frank A. Spear, Jr.
Attorney, Agent, or Firm—Williamson, Bains, Moore & Hansen

[57] ABSTRACT

A device for removing dissolved gases from liquids is provided by utilizing a tall column initially filled with liquid which is then opened at the bottom allowing the liquid level to drop forming a vacuum above the liquid level. Dissolved gases migrate to the vacuum area and the purified liquid is then drained from the bottom of the column and the process repeated. The above method of providing a vacuum allows more efficient distillation due to the lower boiling temperature resulting from the vacuum over the liq 6 Claims, 1 Drawing Figure

LIQUID DEGASIFICATION DEVICE

BACKGROUND OF THE INVENTION

While liquids such as water may be purified by many known means such as distillation, most "purified" water continues to contain some dissolved atmospheric gases therein, such as carbon dioxide and the like, which may be undesirable for use in certain applications, such as those in the medical field. It is therefore desirable to provide an apparatus which is capable of removing such dissolved gases in an expeditious manner so as to be able to provide a pure liquid. While the description of the invention hereinafter may refer to water, it will be appreciated that the instant invention may be utilized for any number of other liquids.

Heretofore, the use of a vacuum or partial vacuum to remove dissolved gases from a liquid has been known. In particular, U.S. Pat. Nos. 2,151,644, 2,041,059, and 3,116,999 all disclose such a vacuum technique in general.

It is an object of the instant invention to remove some of the deficiencies of the above prior art by providing a device which may be produced more inexpensively and which is less complex to build and operate than those of the prior art.

In principle, the instant invention uses the basic technique of a water barometer as its operative principle and hence a classic water barometer must be considered prior art.

SUMMARY OF THE INVENTION

The instant invention is comprised generally of a tall degasification column having a height of at least thirty three feet and preferably at least sixty feet. A vent having a selectively operable valve is located at the top of the column and a valve-operated drain located at the bottom of the column, the drain connecting with a container for the collection of degassed liquid. A separate reservoir is provided for supplying water to the column. Initially, the column is filled with water and all valves into or out of the column closed. At this point, a valve connecting the bottom of the column with the reservoir is opened and the water level in the column allowed to attain an equilibrium level which will be approximately 33.9 feet in height at sea level. The space above the water then will be substantially a vacuum and into this vacuum the dissolved gases from the liquid in the lower part of the column will migrate. After a suitable length of time at this equilibrium level, the degassed liquid in the lower part of the column is drained into a collection device. The collection device should be a collapsed bag or some other container under a vacuum so as to prevent any gas from going back into solution in the liquid. The drain valve is then closed and the column refilled and the cycle then repeated.

A heat source may be provided at the bottom of the column in order to perform a distillation operation which utilizes the vacuum produced to lower the boiling temperature and the amount of energy needed for distillation.

These and other objects of the invention will become readily apparent as the following description is read in conjunction with the accompanying drawing wherein like reference numerals are used to refer to the view shown.

DESCRIPTION OF THE PREFERRED EMBODIMENT

Figure 1:
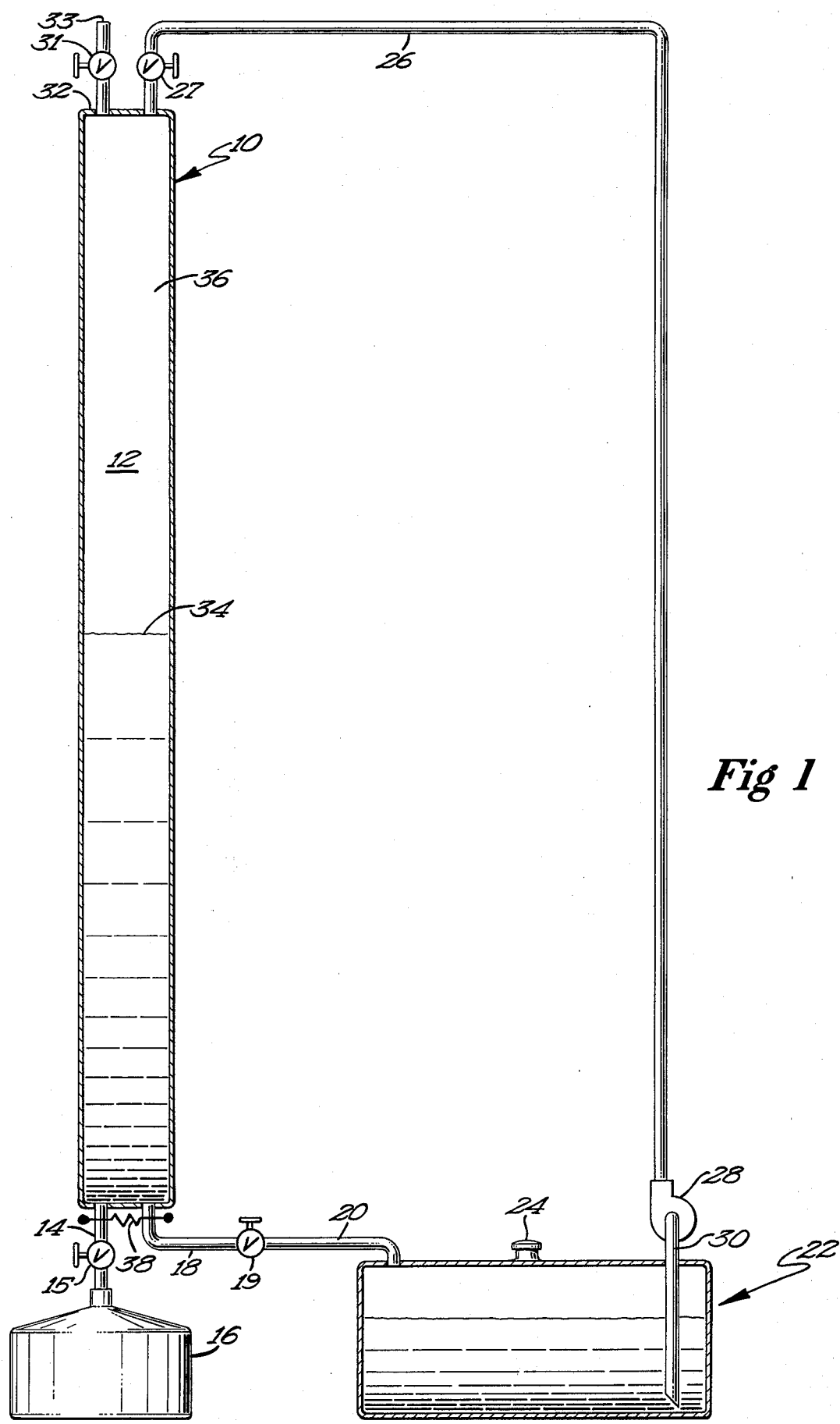
FIG. 1 is a schematic representation of the instant invention in the subject heading "Description of the Preferred Embodiment."

A liquid degasification device, generally 10, is comprised of a substantially vertical column 12. Column 12, for use with water, must be at least approximately 33 feet high at sea level and is desirably much higher, with a height of 60 feet being a good workable figure. As will be appreciated later on in this description, the higher the column the more effective the operation of the device. A drain pipe 14 is located at the bottom of column 12. A valve 15 may be opened or closed to control the flow through drain pipe 14, and a collection container 16 is attached at the end of drain pipe 14. Container 16 may be any of several type devices which will prevent the reintroduction of gases into contact with the degassed liquid. Such containers may include a plastic bag which is initially collapsed and which expands as it is filled with liquid or a container under a separate vacuum. The collapsed plastic bag alternative would of course be the cheaper and the more expeditious alternative of the two.

A second drain pipe 18 has a valve 19 disposed therein and connecting valve 19 with reservoir 22 is pipe 20. Reservoir 22 must be capable of holding at least the volume of water to be held by column 12 and should have a provision for replenishing the level therein (not shown). A cap 24 is provided for access to reservoir 22. A filling line 26 is fed by pump 28 which in turn draws through line 30 from reservoir 22. Fill line 26 is selectively connected with reservoir 22 by valve 27. While the location of the fill line 26 may be as shown, alternatively fill line 26 may also be introduced into column 12 at approximately the equilibrium water level 34 as shown in FIG. 1. A vent 33 is disposed at the top 32 of column 12 and a vent valve 31 is interposed in vent 33 and provides a means for selectively sealing the vent 33.

A heat source 38 may be provided at the bottom of column 10 in order that more efficient distillation may take place due to the lowered boiling temperature produced by the forming of a vacuum over the liquid surface. Outlet 33 may be connected to a condenser for use in such a distillation operation.

OPERATION OF THE INVENTION

Initially to operate the invention, valves 15 and 19 are closed and valves 31 and 27 opened. Thereafter, pump 28 is activated, thereby filling column 12 with water until water begins to exit through vent 33. Thereafter, valves 27 and 31 are closed and valve 19 opened. The liquid in column 12 will drain to an equilibrium level as shown by the numeral 34 in the drawing FIGURE. This level will be approximately 33.9 feet at sea level (with water) and the space 36 thereabove will be essentially a vacuum. Thereafter, dissolved gases in the liquid in the column will migrate from the liquid into the substantial vacuum in the space 36. After a period of time, the system will come into equilibrium with a substantial amount of the gases having reached the vapor phase in space 36. Thereafter, valve 19 is closed and valve 15 opens allowing a certain amount of degassed water to drain into collecting vessel 16. Thereafter the process is repeated with the filling water driving the gases out vent 33 until the desired amount of purified water has been obtained.

It is to be noted that while the embodiment shown is a single tank system, it will become obvious to those skilled in the art that multiple columns may be used so that the pump, for instance, may be active on a relatively continual basis so that while pumping is occurring into one column, other columns may be at the equilibrium phase and still others may be in the draining phase.

While the preferred embodiment of the present invention has been described, it should be understood that various changes, adaptations and modifications may be made therein without departing from the spirit of the invention and the scope of the appended claims.

What is claimed is:

1. An apparatus for the degasification of water, said apparatus comprising:
   a degasification column for removal of dissolved gases which are in solution with water and having a top and a bottom, said column having a length exceeding the height of the water which would be supported within the column by atmospheric pressure when the top of the column is in substantially evacuated condition;
   a water reservoir;
   means for venting gases from the top of said column;
   means for selectively sealing said venting means;
   means for selectively draining degassed water from said column
   means for selectively connecting said column to said reservoir for controlling water flow therebetween; and
   a container under a vacuum and connected with said means for selectively draining degassed water to receive and retain degassed water.

2. The apparatus of claim 1 further comprising a heat source in operative relationship to said column.

3. The apparatus of claim 1 wherein said connecting means further comprises a first conduit connecting said reservoir and said column bottom and valve means in said first conduit to selectively drain water from said column to said reservoir.

4. The apparatus of claim 3 wherein said connecting means includes a pump for pumping water from said reservoir to said column and wherein said connecting means comprises a second conduit connecting said pump and said column top.

5. The apparatus of claim 1 wherein said drain means is located at said column bottom and wherein said connecting means further comprises a first conduit connecting said reservoir and said column bottom and valve means in said first conduit to selectively drain water from said column to said reservoir.

6. A method of removing dissolved gas from solution with water, said method comprising steps of:
   completely filling a column with water;
   sealing said column;
   opening a drain in the bottom of said column so that the water will fall to an equilibrium level within said column defined by ambient atmospheric pressure, creating a partial vacuum in said column above said equilibrium level;
   allowing the water to remain undisturbed at said equilibrium level in said column while the dissolved gases move upward into the partial vacuum to degassify the water; and
   draining the degassed water.

* * * * *